V. BORST.

Harness-Saddles.

No. 5,883. Reissued May 26, 1874.

WITNESSES:
James A. Hunter
K. Newell

Valentine Borst
INVENTOR:

BY A. J. Todd
ATTORNEY.

AM. PHOTO-LITHOGRAPHIC Co. N.Y. (OSBORNE'S PROCESS.)

UNITED STATES PATENT OFFICE.

VALENTINE BORST, OF NEW YORK, N. Y., ASSIGNOR TO SAMUEL E. TOMPKINS.

IMPROVEMENT IN HARNESS-SADDLES.

Specification forming part of Letters Patent No. 109,108, dated November 8, 1870; reissue No. 5,883, dated May 26, 1874; application filed April 6, 1874.

*To all whom it may concern:*

Be it known that I, VALENTINE BORST, of New York, in the county and State of New York, have invented certain new and useful Improvements in Harness-Saddles; and that the following is a full, clear, and exact description of the same, reference being had to the accompanying drawing forming part of this specification.

The invention consists, first, in forming transverse terret bars or bridges spanning the channel or space in the tree, in which channel or space the backband rests; second, in constructing the cantle of wood and metal combined, so that the part which is fastened to the metal tree is of metal while the rear part is of wood.

Figure 1:
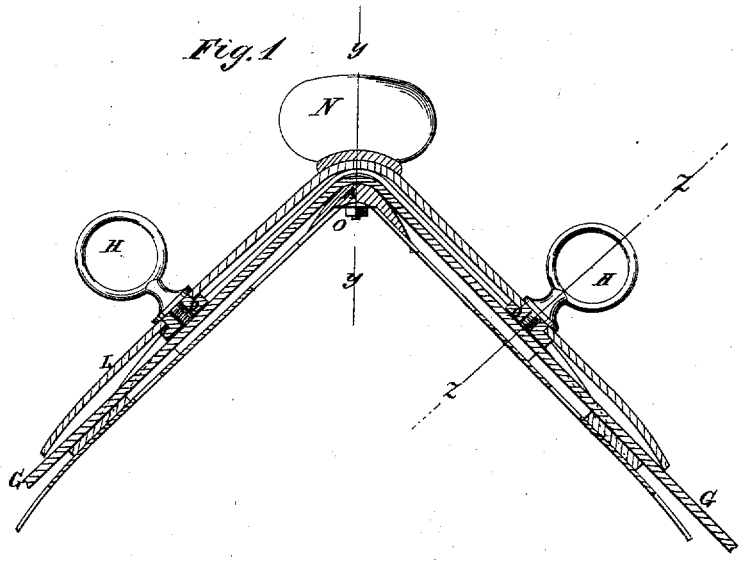
Figure 2:
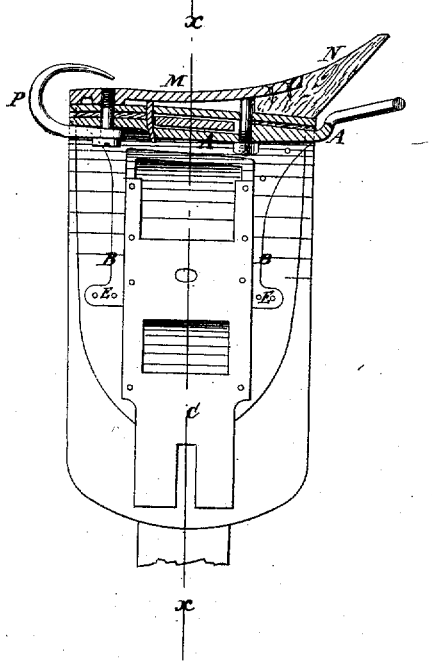
Figure 3:
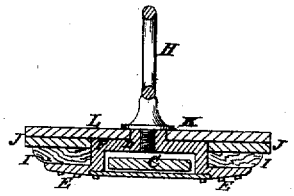

In the drawing, which serves to illustrate the invention, Figure 1 is a transverse section of a tree containing the referred-to improvements, taken in the line *x x* of Fig. 2. Fig. 2 is a section from front to rear in the line *y y* of Fig. 1. Fig. 3 is a section in the line *z z* of Fig. 1, showing in section one of the terret bars or bridges referred to.

A is a metallic skeleton-frame formed with lateral arms B B, which extend downward on each side from the summit of the frame, and to which are secured the metallic elastic side plates C, which serve to secure the loops for the backband. D is a terret bar or bridge, which is arranged transversely to the skeleton-frame, near the ends of its arms B B. The central parts of the terret-bars are raised, as seen at F, high enough to allow room for the backbands G G to pass under the raised portions of the bars.

In this example I have combined the terret-bar with the frame A by casting them together in one piece, and the terret-bars are tapped to allow the shanks of the terrets H H to be screwed down into them, so as to secure the terrets in place without interfering with the backbands or with any part of the saddle. The depressed portions or ends E E of the bars are surmounted by the usual wooden mountings I I, and by a leather filling-piece, J, which fits around the raised part F of the terret-bars, and the terret-hole in said bar has a boss, K, around its upper edge, around which the leather cover L is fitted in such a manner that the flange of the terret comes down upon the boss and overlaps the cover. The anterior part M of the cantle—the part which is secured to the rest of the saddle—is made of metal, while the posterior part N is of wood. By this combination I retain the desired strength in those portions of the cantle which receive the fastening devices, while the weight of the cantle is lessened; and, furthermore, by making the rear portion of wood, I obviate the liability of the covering of that part of the cantle to become rusty and discolored from contact with a metallic surface. The bolt O goes up through the head of the bridle-hook P, then successively through the skeleton-frame, the wooden and leather mountings, and the cover, and then screws into the cantle. The head of the bolt O is situated under the crotch of the skeleton-frame, out of the way of any interference with other parts, and it is not liable to displacement, while its end is screwed into the cantle; and consequently the use of a nut to hold it to the saddle is rendered unnecessary.

What I claim as new, and desire to secure by Letters Patent, is—

1. The combination, with a metallic tree, of elevated bars or bridges receiving the terrets and spanning the channel extending across the tree for the backband, substantially as described.

2. In cantles, the combination of a metallic anterior part with a wooden posterior part, substantially as described.

VALENTINE BORST.

Witnesses:
K. NEWELL,
JAMES H. HUNTER.